United States Patent [19]

Kaneko et al.

[11] Patent Number: 5,202,605
[45] Date of Patent: Apr. 13, 1993

[54] MIM COLD-CATHODE ELECTRON EMISSION ELEMENTS

[75] Inventors: Akira Kaneko, Tokyo; Toru Kanno, Kawasaki; Kaoru Tomii, Isehara, all of Japan

[73] Assignee: Matsushita Electric Industrial Co., Ltd., Osaka, Japan

[21] Appl. No.: 429,526

[22] Filed: Oct. 31, 1989

[30] Foreign Application Priority Data

| Oct. 31, 1988 | [JP] | Japan | 63-274852 |
| Nov. 4, 1988 | [JP] | Japan | 63-278702 |
| Nov. 4, 1988 | [JP] | Japan | 63-278707 |
| Dec. 22, 1988 | [JP] | Japan | 63-324107 |
| Dec. 23, 1988 | [JP] | Japan | 63-326613 |

[51] Int. Cl.$^5$ ............................................. H01J 29/46
[52] U.S. Cl. ............................................. 313/444; 313/310
[58] Field of Search ................. 313/444, 320; 357/6, 357/4

[56] References Cited

U.S. PATENT DOCUMENTS

| 3,184,636 | 5/1965 | Dore et al. | 315/94 |
| 3,184,659 | 5/1965 | Cohen | 317/238 |
| 3,325,733 | 6/1967 | Lemelson | 357/6 |
| 3,447,043 | 5/1969 | Wallace | 357/12 |
| 3,447,045 | 5/1969 | Hickmott | 357/6 |

FOREIGN PATENT DOCUMENTS

| 1589822 | 3/1970 | Fed. Rep. of Germany . | |
| 1572047 | 6/1969 | France . | |
| 62-272421 | 11/1987 | Japan . | |
| 291081 | 12/1987 | Japan | 357/6 |
| 63-6717 | 1/1988 | Japan . | |
| 63-80437 | 4/1988 | Japan . | |

OTHER PUBLICATIONS

Sze; Semiconductor Devices, 1985, p. 472.
Feist; Research in Tunnel emmission; IEEE Spectrum Dec. 1964; pp. 57-66.
Journal of Applied Physics, vol. 45, No. 1, Jan. 1974, pp. 119-125, New York, US; D. G. Onn et al.: "Cryogenic thin-film electron emitters".

*Primary Examiner*—Donald J. Yusko
*Assistant Examiner*—Michael Horabik
*Attorney, Agent, or Firm*—Lowe, Price, LeBlanc & Becker

[57] ABSTRACT

An MIM type of electron emission element having a thin insulating film formed below an electron emission region of a metal layer, with that electron emission region of the metal layer consisting of an array of thick and thin portions, distributed throughout the electron emission region. Improved efficiency and uniformity of of emission are obtained, due to the low resistance of the thick portions, which apply a supply voltage to the thin portions of the metal layer, while the thin portions can be made sufficiently thin to maximize the electron emission.

6 Claims, 15 Drawing Sheets

MIM COLD-CATHODE ELECTRON EMISSION ELEMENTS

BACKGROUND OF THE INVENTION

1. Field of Applicable Technology

The present invention relates to structures and methods of manufacture for an electron emission element which can be utilized as a source of electron emission, for use in various types of apparatus which utilize an electron beam, such as electron microscopes, CRTs, etc. In particular, the invention is directed towards improved structures and methods of manufacture for thin-film electron emission elements which are basically of a metal - insulation - metal layer configuration.

2. Prior Art Technology

In the prior art, a heated cathode is used for electron emission in equipment which uses an electron beam, such as electron microscopes and CRTs. However, with a heated cathode it is of course necessary to provide heating means to produce electron emission, and this has the disadvantage of high energy consumption. For this reason, various types of electron emission elements have been researched which provide electron emission without heating, i.e. cold-cathode electron emission elements.

As a specific example, if a reverse bias voltage is applied to a PN junction, then an avalanche condition can be produced whereby electron emission from the PN junction can be obtained. Alternatively, a localized high-intensity electric field can be applied to a metal electrode, causing field-effect electron emission to occur. Another method is to use a device having a metal - insulator - metal layer configuration (i.e. an MIM type of electron emission element), where the insulating layer and one of the metal layers are respectively formed as extremely thin films, and with the thin metal layer being disposed in a vacuum, and to apply a voltage between the two metal layers whereby electrons execute tunnelling through the insulating layer and a proportion of these are then emitted from the thin metal layer. Of the above types of cold-cathode devices, the MIM electron emission element has the advantage of a simple type of construction, and will be described in the following.

The basic principles of an MIM electron emission element are illustrated in FIG. 1. A metal layer (conducting material layer) 41 has a very thin insulating layer 42 formed thereon, and a very thin metal layer 43 is formed upon the insulating layer 42. The upper surface of the metal layer 43 is exposed to a vacuum, or low pressure gas. By applying a voltage from a power source 44 between the metal layers 41 and 43, having a value that is greater than the work function of the metal layer 43, electron tunnelling through the insulating layer 42 will occur. Some of the tunnelling electrons will have a greater energy than the vacuum potential, and so are emitted from the surface of the metal layer 43, as emitted electrons 45.

FIGS. 2 and 3 show respective specific examples of a prior art type of MIM electron emission element. With the electron emission element of FIG. 2, a metal layer 52 consisting of Al and a metal layer 55 consisting of Au are successively formed on a surface of a glass substrate 51. An insulating layer 52, consisting of $Al_2O_3$ and an electrically insulating layer 54 consisting of $SiO_2$ are formed between the metal layers 52 and 55. When a voltage is applied between the metal layers 52 and 55, electrons are emitted from the electron emission region 56 of the metal layer 55. This is described in the Electronic Apparatus Reasearch Conference Papers of the Television Society, with the title "Cathode Ray Tube Using Tunnel Cathode", 1968, 4, 30.

With the prior art MIM electron emission element of FIG. 3, the metal layer 62 is formed as a strip upon the surface of an electrically insulating layer 61, then an electrically insulating layer 63 is formed on the metal layer 62. Next, a metal layer 64 is formed upon the insulating layer 63, also in the shape of a strip, positioned such as to perpendicularly intersect the metal layer 62. When a voltage is applied between the metal layers 62 and 64, electrons are emitted from an electron emission region of the metal layer 64, with the area of this electron emission region being defined as the region of intersection between the two metal layers. This electron emission element is described in Japanese Patent Laid-open No. 63-6717.

However with the above types of prior art MIM electron emission element, the problem arises that the electron emission distribution within the electron emission region is non-uniform, i.e. there are positions within the electron emission region at which the rate of electron emission is high, and regions where emission is low. Furthermore, with such a prior art type of electron emission element, in addition to the problem of unevenness of electron emission, the metal layer that is formed on the insulating layer will in many cases have poor electrical conductivity.

The reason for the non-uniformity of electron emission distribution is as follows. In order to maximize the efficiency of electron emission from the metal layer that is formed on the insulating layer, that metal layer must be made extremely thin within the electron emission region. However since it is difficult to form the electron emission region with a very uniform thickness of thin metal film, there will inevitably be some variations in thickness within the electron emission region. This results in non-uniformity of electron emission distribution in the electron emission region. Furthermore, due to the fact that the metal layer is very thin, successive voltage drops will occur within that layer, from the point of connection of the metal layer to a power source. Thus, the effective electric field strength within the electron emission region will be non-uniform, causing the electron emission to be uneven within that region. In addition, those electrons which are unable to leave the metal layer by being emitted therefrom, after having passed through the insulating layer by tunnelling, will produce a flow of current within the metal layer. The greater the level of this current flow, i.e. the lower the efficiency of electron emission of the element, the greater will be an amount of Joule heating that is produced in the thin metal layer, whereby heat is generated within portions of that layer. As a result, it becomes impossible to apply a stable and uniform electric field to the insulating layer within the electron emission region, whereby uniformity of electron emission is prevented.

The reasons for the poor conduction of the metal layer are as follows. With the electron emission element of FIG. 3, there are step variations in the height of the surface of the insulating layer, and corresponding step changes are produced in the metal layer that is formed on the insulating layer. Due to these step changes in shape of the layers, corners are formed, and as a result of these corners formed in the layers, defects are produced in the thin metal layer, so that poor electrical conduction in that layer will occur.

Another problem which arises with such a prior art type of MIM electron emission element is that the electron emission efficiency is insufficient. The insulating layer is formed in the prior art as a very thin film, having a thickness of approximately 50 to 200 Å, by a process such as evaporative deposition, anodic oxidation, etc. and is not formed with a crystal structure, i.e. is an amorphous layer. As a result, most of the electrons which move within the insulating layer by the tunnelling effect will be dispersed within that layer as a result of collisions with atoms of the material constituting the layer, and will thereby lose energy, so that the number of electrons which actually are transferred to the thin metal layer of such an electron emission element will be very small.

In addition, the electrons which enter this thin metal layer will also be dispersed, and suffer a further energy loss thereby. In order to reduce this dispersion within the thin metal layer, that layer must be made as thin as possible. However if that layer is made very thin, then a substantial voltage drop will occur between the point of connection of that metal layer to a power source terminal and an electron emission region of the metal layer, as described above. Thus, the intensity of the electric field that is produced in a region of the insulating layer immediately below an electron emission region of the thin metal layer is reduced, and hence effective electron emission cannot be achieved. This reduction of effective electric field strength within the electron emission region can be counteracted to some extent by increasing the level of voltage supplied by the power source. However in that case, Joule heating will occur due to the electrical power which will be dissipated within the metal layer, resulting in non-uniform electron emission and the danger of open-circuits in the thin metal layer.

Furthermore, with such an MIM type of electron emission element, both the thin-film insulating layer (through which the tunnelling electrons pass) and the thin-film metal layer (from which electrons are emitted) are formed upon an underlying layer which has an upwardly protruding portion and/or an inwardly recessed portion, i.e. which has an upper surface that exhibits step changes in height. As a result, each of the thin insulating layer and thin metal layer will also have corresponding step changes in height, so that the respective film thicknesses of these layers will be non-uniform. Hence, the operating characteristics of such an electron emission element are unstable. In particular, if the thin metal layer is formed with such step variations in height, then internal defects may be produced within that layer in regions which are close to these step changes, i.e. at corner portions. This can result in localized variations in electrical conduction at these portions, as well as non-uniformity of film thickness, thereby further contributing to deterioration of the electrical characteristics. Moreover, if an array is formed of a plurality of such MIM electron emission elements, the characteristics of respective elements of the array will vary significantly from one another.

SUMMARY OF THE INVENTION

It is a first objective of the present invention to provide an MIM type of electron emission element which overcomes the above problem of non-uniform of electron emission distribution of prior art devices.

It is a second objective of the present invention to provide an MIM type of electron emission element which has high reliability of electrical conduction of a metal layer from which electrons are emitted.

It is a third objective of the present invention to provide an MIM type of electron emission element whereby dispersion of electrons which travel through a thin insulating layer by the tunnelling effect is suppressed, to thereby achieve an enhanced degree of electron emission efficiency.

It is a fourth objective of the present invention to provide an MIM type of electron emission element whereby even when a region of a metal layer from which electrons are emitted is made extremely thin, voltage drops within that metal layer and open-circuits resulting from power dissipation within that layer are effectively prevented.

It is a fifth objective of the present invention to provide an MIM type of electron emission element whereby each of a thin insulating layer through which electrons pass by the tunnelling effect and a thin metal layer from which electrons are emitted is formed as a completely flat layer.

It is a sixth objective of the present invention to provide a simple method of manufacture for an MIM type of electron emission element whereby prior art problems of non-uniform electron emission distribution are overcome.

According to one aspect, an electron emission element according to the present invention comprises an electrically insulating material formed on a layer of electrically conducting material (or a bulk conducting body), with a metal layer formed over the insulating layer. Immediately below an electron emission region of the metal layer, the insulating layer is formed as an extremely thin film, while the metal layer within the electron emission region is formed as an array of thick and thin portions which are distributed throughout that region. The thick portions of the metal layer serve to ensure that a sufficient level of voltage will be applied to the thin portions, while the thin portions are made sufficiently thin to ensure high efficiency of electron emission.

It has been found that such an array of thick and thin portions of the metal layer can be very easily formed by executing evaporative deposition of a metal through a mask having a pattern of apertures therein, if the mask is positioned spaced apart from the insulating layer by a specific distance. The "thin portions" in this case are constituted by sloping edge portions which extend from each thick portion.

The thin insulating layer portion corresponding to the electron emission region can be formed by providing an upwardly protruding portion of the conducting layer, and forming an insulating layer which covers the upwardly protruding portion and surrounding regions of the conducting layer and has a flat upper surface. Alternatively, a first insulating layer can be formed surrounding the upwardly protruding portion of the conducting layer, to the same height as that upwardly protruding portion, and a thin insulating layer then formed overall, with a flat upper surface. It is also possible to form the latter thin insulating layer as an oxide film on the upwardly protruding portion of the conducting layer. In each case, an overall insulating layer having a flat upper surface is formed, on which the thin metal layer is then deposited as a completely flat thin film. With such a configuration, the shape of the electron emission region of the electron emission element can be selected as required, by the shape of the upwardly protruding portion of the conducting layer.

According to another aspect of the invention, the thin insulating layer below the electron emission region is formed as an epitaxially grown layer of single-crystal material, with the crystal planes oriented with respect to the layer surface such as to minimize dispersion of electrons which pass through that insulating layer by tunnelling. The efficiency of electron emission can thereby be substantially increased.

More specifically, one embodiment of the invention is an electron emission element comprising an electrically conducting layer, an electrically insulating layer formed on the conducting layer, and a metal layer formed on the insulating layer, wherein the metal layer is formed with an electron emission region comprising a plurality of relatively thick portions of the metal layer and a plurality of relatively thin portions of the metal layer, the thick and thin portions being distributed throughout the electron emission region.

Another embodiment of the invention is an electron emission element comprising an electrically conducting body having an electrically insulating layer formed thereon, and a metal layer formed on the insulating layer, with respective values of thickness of at least portions of the insulating layer and metal layer being selected such as to permit electron emission from an electron emission region of the metal layer in response to application of a specific level of voltage between the conducting body and the metal layer, wherein at least a part of the insulating layer corresponding in position to the electron emission region comprises a single-crystal layer of an electrically insulating material having crystal planes thereof oriented in predetermined directions.

Another emodiment of the invention is an electron emission element comprising a substrate, an electrically conducting layer formed on a predetermined region of a surface of the substrate, a first electrically insulating layer formed on the conducting layer, a second insulating layer formed on a region of the substrate outside the first insulating layer, with an upper surface of the second insulating layer being co-planar with an upper surface of the first insulating layer, and a metal layer formed on the first and second insulating layers.

Yet another embodiment of the invention is an electron emission element comprising an electrically conducting body having a surface thereof formed with an upwardly protruding portion, an electrically insulating layer formed to cover the conducting body and having a flat upper surface, and a metal layer formed upon the insulating layer surface, the metal layer extending above the upwardly protruding portion of the conducting body and at least partially overlapping a boundary of the upwardly protruding portion.

A further embodiment of the invention is an electron emission element comprising an electrically conducting body formed on a portion of a surface of a substrate, an electrically insulating layer formed upon the conducting body and the surface, the insulating layer having a flat upper surface, and a metal layer formed on the insulating layer surface, extending above the conducting body.

The invention further describes a method of manufacture for an electron emission element, comprising successive steps of:

forming a layer of an electrically conducting material on a surface of a glass substrate;

forming a layer of an electrically insulating material on the conducting material layer;

forming a metal layer upon the layer of insulating material;

forming a patterned photoresist layer on the metal layer; and executing photo-lithography etching of the metal layer, employing the photoresist layer, to selectively remove portions of the metal layer.

The invention moreover includes a a method of manufacture for an electron emission element, comprising successive steps of:

forming a layer of an electrically insulating material on a region of a conducting body corresponding to an electron emission region, the thickness of the layer of insulating material being selected such as to permit an electron tunnelling effect to occur in the layer of insulating material; and executing evaporative deposition of a metal onto a surface of the insulating layer through a mask, the mask having a predetermined pattern of apertures formed therein, and the mask being spaced apart from the layer of insulating material by a predetermined distance;

for thereby forming a plurality of thick portions and a plurality of sloping portions of the metal layer within the electron emission region, each of the sloping portions being integrally formed with a corresponding one of the thick portions and being of gradually varying thickness, the thick portions and thin portions being distributed throughout the electron emission region.

BRIEF DESCRIPTION OF THE DRAWINGS

FIGS. 5A to 5C are diagrams showing a second embodiment of an MIM type of electron emission element according to the present invention, in which FIG. 5A is a cross-sectional view, FIG. 5B is an expanded partial cross-sectional view of a metal layer in FIG. 5A, and FIG. 5C is a partial expanded plan view of a metal layer in FIG. 5A;

FIGS. 6A and 6B show a third embodiment of an electron emission element according to the present invention, in which FIG. 6A is a cross-sectional view and FIG. 6B is a partial expanded cross-sectional view of a metal layer;

DESCRIPTION OF PREFERRED EMBODIMENTS

Figure 1:
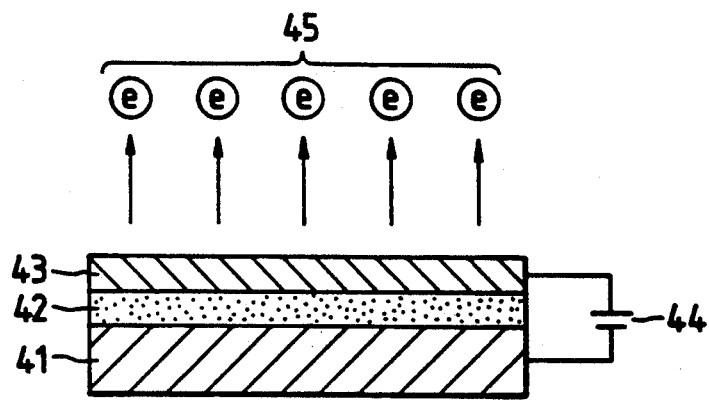
FIG. 1 is a conceptual cross-sectional view for describing the basic principles of a MIM electron emission element.
Figure 2:
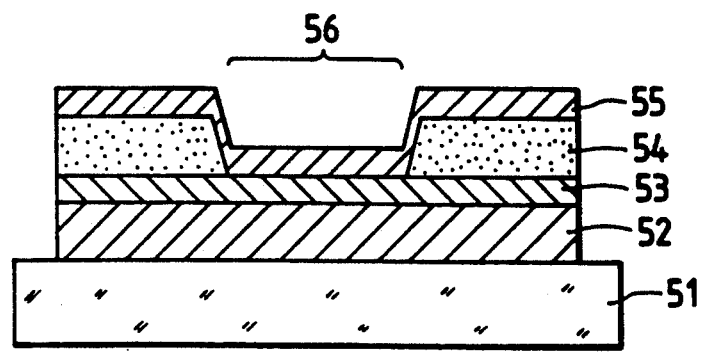
FIG. 2 is a general cross-sectional view of an example of a prior art MIM type of electron emission element.
Figure 3:
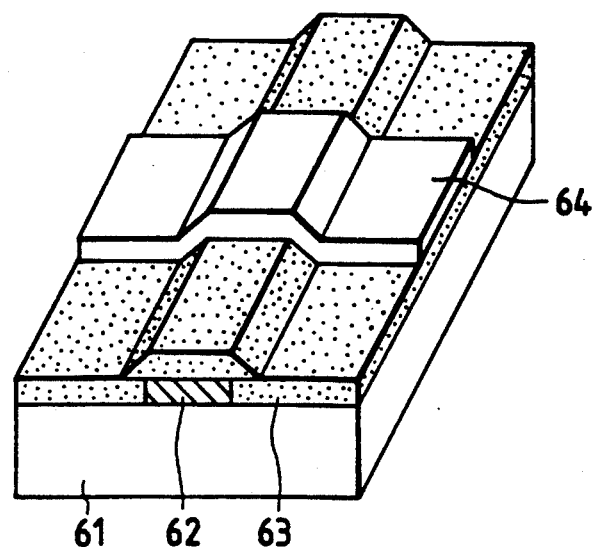
FIG. 3 is a general oblique view of another example of a prior art MIM type of electron emission element.

Embodiments of the invention will be described in the following, referring to the drawings.

Figure 4A:
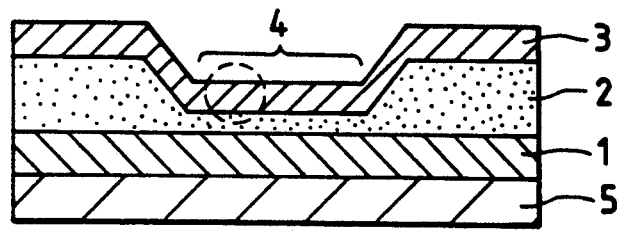
FIG. 4A is a general cross-sectional view of a first embodiment of an electron emission element according to the present invention.
Figure 4B:
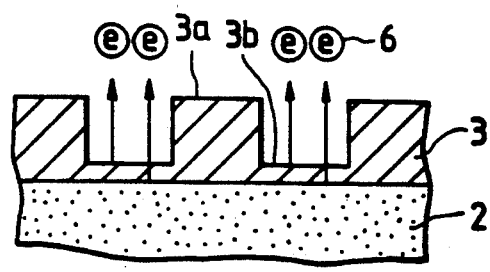
FIG. 4B is an expanded cross-sectional view of an electron emission region in the embodiment of FIG. 4A.

It should be noted that terms such as "upper", "upward", "upwardly protruding" etc. as applied to layers formed in the various embodiments, which assume that each embodiment is oriented as indicated in the respective drawings, with an electron emission metal layer oriented horizontally as an uppermost layer, are of course used only for simplicity of description, FIG. 4A is a general cross-sectional view of a first embodiment of an electron emission element according to the present invention. FIG. 4B is an expanded view of a portion of an electron emission region that is located within a broken-line outline shown in FIG. 4A. In these figures, numeral 1 denotes a layer of an electrically conducting material which is formed on a substrate 5, numeral 2 denotes an insulating layer which is formed on the conducting layer 1, numeral 3 denotes a metal layer formed on the insulating layer 2, numeral 4 denotes an electron emission region at the center of the metal layer 3, numeral 5 denotes a substrate which is the lowest layer, and numeral 6 denotes electrons which are emitted from the electron emission region 4.

An example of a method of manufacture for such an electron emission element is as follows. On a glass substrate 5 is formed a thin film of Al as the conducting layer 1, to a thickness of 3,000 to 5,000 Å approximately, by a method such as vacuum evaporative deposition or by sputtering deposition. A layer of a material such as $Al_2O_3$ or $SiO_2$ is then formed on a region of the Al film 1 which corresponds to the electron emission region 4, as the insulating layer 2, by a method such as vacuum evaporative deposition or sputtering deposition, or by anodic oxidation, to a thickness of 50 Å to 200 Å. This electron emission region 4 has a diameter of approximately 100 μm. Next, a layer of a metal such as Au or Al is formed as the metal layer 3, upon the insulating layer 2. As shown in FIG. 4B, the metal layer 3 consists of thin portions 3b (each having a film thickness of 50 Å to 200 Å approximately) and thick portions 3a (each having a film thickness of 1000 Å approximately). This metal layer 3 is formed by a method such as vacuum evaporative deposition or by sputtering deposition.

An example of a method of forming the thick and thin portions 3a and 3b of the metal layer 3 is as follows. A layer of Au or Al is formed on the insulating layer 2, by a process such as vacuum evaporative deposition or sputtering deposition, to a thickness of approximately 1000 Å, then a layer of photoresist is formed thereon, and the photoresist is then exposed to a pattern of light which has a pitch of approximately 10 μm. The photoresist is then developed and the portions of photoresist corresponding to the regions within the electron emission region 4 that are to be made thin are removed. Etching of these regions of the metal layer 3, to a depth which is close to the surface of the insulating layer 2, is then performed. The remaining photoresist is then removed.

It can be understood that with such an element, each of the thin portions of the metal layer within the electron emission region is integrally connected to at least one corresponding thick portion. Thus, by applying a voltage between the conducting layer 1 and the metal layer 3 of such an MIM electron emission element, such that the metal layer 3 is made positive, a voltage is applied through the thick portions 3a of the metal layer 3 to the thin portions 3b. Since the voltage drop which occurs in the thick portions 3a is very small, substantially uniform values of voltage are applied to the thin portions 3b, whereby uniform emission of electrons 6 is obtained from the thin portions 3a in the electron emission region.

Figure 5A:
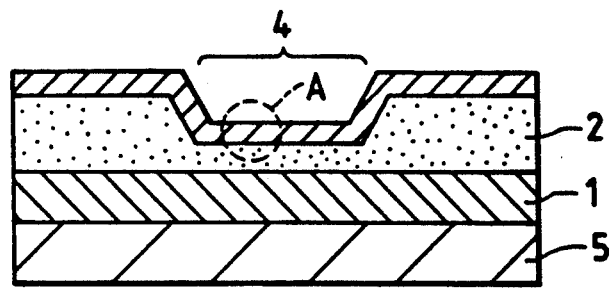
Figure 5B:
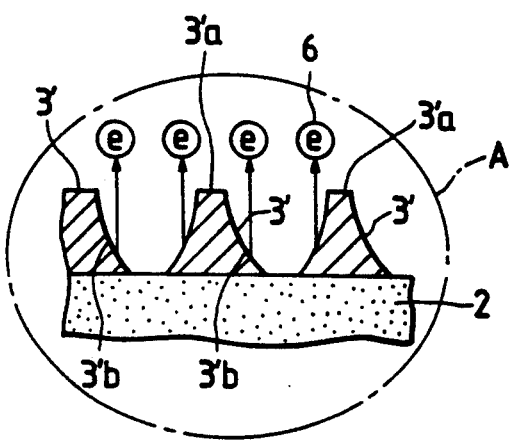
Figure 5C:
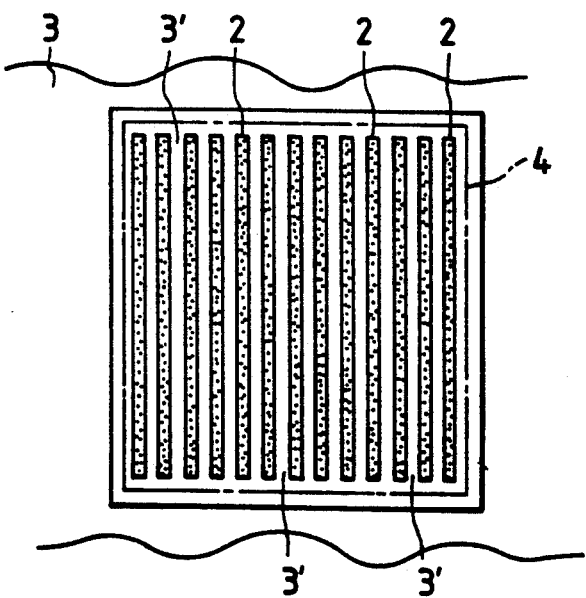

FIGS. 5A to 5C illustrate a second embodiment of an electron emission element according to the present invention. With this embodiment, an electrically conducting layer 1 (consisting of a material such as Al) is formed on an electrically insulating substrate 5 (consisting of a material such as glass). An electrically insulating layer 2 (consisting of a material such as $Al_2O_3$ of $SiO_2$) is formed as a thin film on the conducting layer 1. A thin metal film 3 (e.g. consisting of Au) is formed on the insulating layer 2. The thickness of the conducting layer 1 is approximately 1000 to 5000 Å. The thickness of the insulating layer 2 is approximately 50 to 200 Å, within an electron emission region 4, and is 2000 to 5000 Å in areas outside the electron emission region 4. The thickness of the thin metal film 3 is 500 to 2000 Å in areas outside the electron emission region 4.

The configuration of the electron emission region 4 of the thin metal film 3 is as follows. As shown in FIG. 5C, the electron emission region 4 is formed with a plurality of mutually parallel narrow stripe-shaped portions 3', with regions of the surface of the insulating layer 2 between these stripe portions 3' being left exposed (i.e. without metal having been deposited thereon). As shown in FIG. 5B, which is an expanded cross-sectional view of the portion A of FIG. 5A, each of these portions 3' of the thin metal film 3 has a flat-topped portion 3'a and sloping portions 3'b. Each of these sloping portions 3'b gradually decreases in thickness from a maximum value to a value of zero, i.e. to finally reach the surface of the insulating layer 2. The central region of each flat-topped portion is a thick portion of the metal layer, which serves to ensure low electrical resistance, while regions which are centered on the sloping portions 3'b of the metal layer constitute thin portions which serve for electron emission. As shown, a large number of these stripe portions 3' having sloping portions 3'b and flat-topped portions 3'a are widely distributed throughout the electron emission region 4. Thus, the thin electron emission portions are widely distributed throughout the electron emission region 4, with each thin portion being of course integrally connected to a thick portion of the metal layer. The thickness of each of the flat-topped portions 3'a of the thin metal film 3 is approximately 500 to 2000 Å.

When a voltage is applied between the conducting layer 1 and the thin metal film 3, then due to the low electrical resistance that is ensured by the flat-topped portions 3'a, voltage drops are prevented. This ensures that a strong electric field is produced, so that electrons are strongly emitted from the overall area of the electron emission region 4.

In the embodiment described above, as shown in FIGS. 5B and 5C, mutually adjacent ones of the sloping portions are separated from one another, with an exposed region of the surface of the insulating layer 2 being formed therebetween. However it would be equally possible to modify that embodiment such that mutually adjacent ones of the sloping portions are connected to one another, i.e. are mutually connected by a region of minimum thickness, so that no exposed regions of the insulating layer 2 are formed between them. It has been found that if this is done, then the results obtained are similar to those obtained for an electron emission element of the form shown in FIGS. 4A, 4B.

Figure 6A:
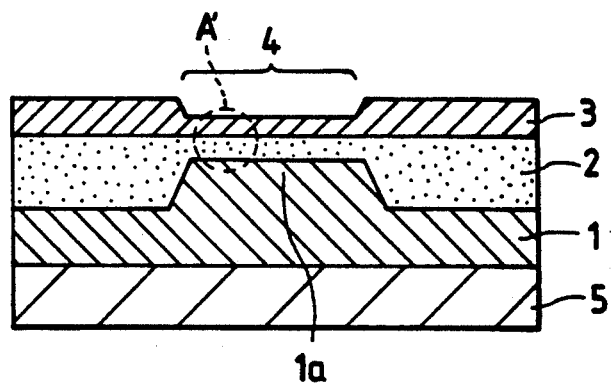

A third embodiment of an electron emission element according to the present invention is as follows. With this electron emission element, as shown in FIG. 6A, an electrically conducting layer 1 (consisting of a material such as Al) is formed on an electrically insulating substrate 5 (consisting of a material such as glass). An insulating layer 2 (consisting of a material such as $Al_2O_3$ of $SiO_2$) is formed on the conducting layer 1. A metal layer 3 (consisting of a material such as Au) is formed on the insulating layer 2.

Figure 6B:
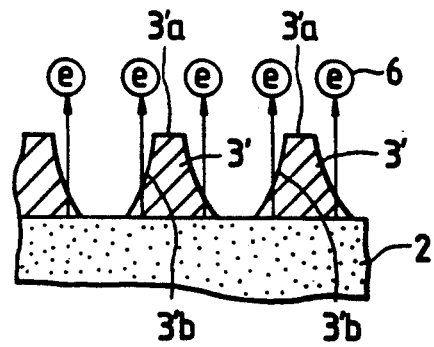

The configuration of the electron emission region 4 of the metal layer 3 is similar to that of the preceding embodiment. As shown in the expanded cross-sectional view of FIG. 6B showing the portion A' in FIG. 6A, the electron emission region 4 has a plurality of parallel narrow stripe-shaped portions 3', with regions of the surface of the insulating layer 2 between these stripe portions 3' being left exposed. As shown, each of these portions 3' of the metal layer 3 has a flat-topped portion 3'a and sloping portions 3'b which gradually decrease in thickness to finally reach the surface of the insulating layer 2.

With this embodiment, the surface of the conducting layer 1 has an upwardly protruding portion 1a corresponding to the position of the electron emission region 4, and the thickness of the portion of the insulating layer 2 that is immediately above this upwardly protruding portion 1a is accordingly decreased. Thus, the boundary of the electron emission region 4 is defined by the shape of the upper surface of this upwardly protruding portion 1a.

The surface of the insulating layer 2 is flat, so that the metal layer 3 is formed over this entire surface without any step changes in height of the layer 3, i.e. the interface between the insulating layer 2 and the metal layer 3 is a single plane, which extends inside and outside the electron emission region 4. Hence, a high degree of reliability of electrical conduction is achieved for the metal layer 3, since that layer can be formed as a single uniform flat film, without corners being formed therein, and hence with a low possibility of defects being formed therein. In addition, the metal layer 3 is thinner within the electron emission region 4 than it is outside the region 4, so that it is easy to ensure that both a high efficiency of electron emission and low electrical resistance are attained.

Furthermore with such an electron emission element, when a voltage is applied between the metal layer 3 and the conducting layer 1, then due to the low electrical resistance that is ensured by the flat-topped portions 3'a, voltage drops are prevented, and a strong electric field is produced, so that electrons are strongly emitted over the entire area of the electron emission region 4.

An example of a method of manufacture for the embodiment of FIGS. 6A and 6B will be described in the following, referring to FIGS. 7A to 7I.

Figure 7A:
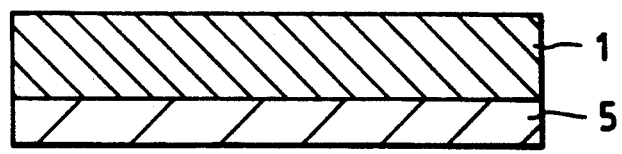
FIGS. 7A to 7I are diagrams illustrating steps of a method of manufacture for the electron emission element of FIGS. 6A to 6B.
Figure 7B:
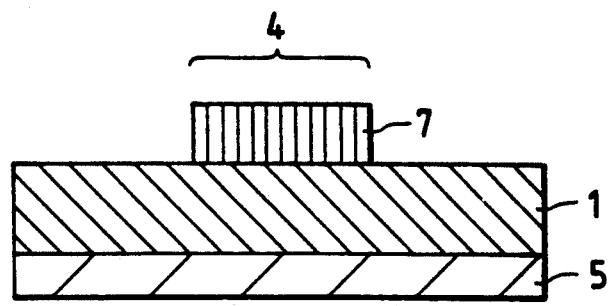
Figure 7C:
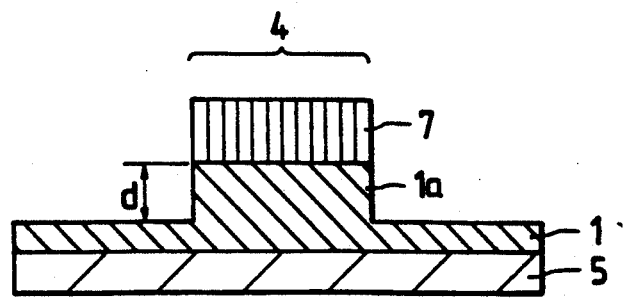

Firstly, a metal layer (consisting of a material such as Al or Ta) is formed on the surface of an insulating substrate 5, consisting of a material such as glass. The metal layer can be formed by by a process such as resistive evaporative deposition, electron beam evaporative deposition, or sputtering deposition deposition, and is formed to a thickness of approximately 1000 to 10,000 Å. In this way an electrically conducting layer 1 is deposited as shown in FIG. 7A. After thus forming the layer 1, then as shown in FIG. 7B a layer of photoresist 7 is selectively formed at positions where the electron emission region 4 is to be formed. The photoresist layer 7 can be formed by the usual photolithography technique.

Figure 7D:
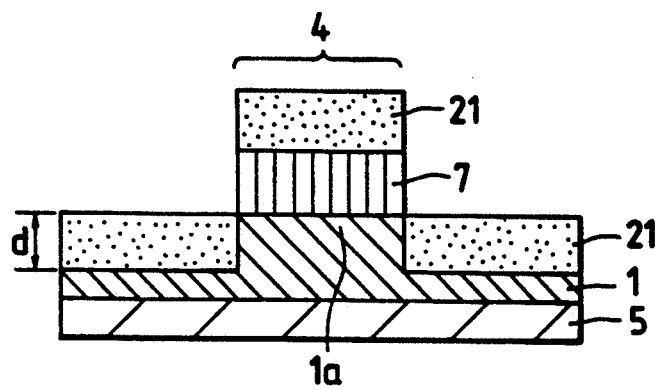

After forming the photoresist layer 7, ion milling or liquid etching is executed to etch those regions of the conducting layer 1 that are not covered with the photoresist, with etching being performed to a depth d of for example 500 to 5,000 Å. The upwardly protruding portion 1a is thereby formed. Next, as shown in FIG. 7D, the insulating layer 21 (consisting of a material such as $SiO_2$, $Al_2O_3$, or $Ta_2O_5$) is formed overall, to the same height as that of the upwardly protruding portion 1a (i.e. to a thickness which is equal to the etching depth d), by a process such as resistive evaporative deposition, electron beam evaporative deposition, or sputtering deposition.

Figure 7E:
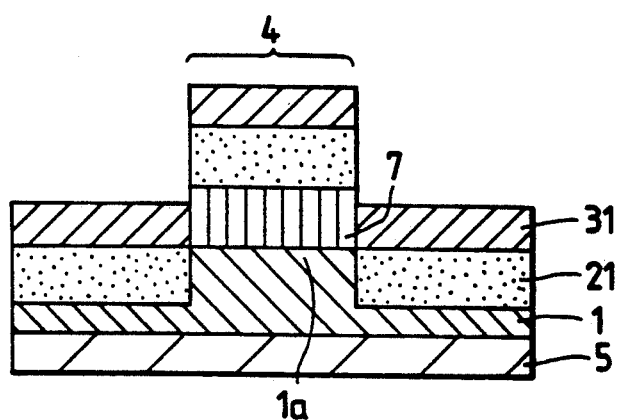

After depositing the insulating layer 21, as shown in FIG. 7E, the metal layer 31 is formed to a thickness of approximately 200 to 1,000 Å (consisting of a material such as Au, Al, Mo or W), by a process such as resistive heating evaporative deposition, electron beam evaporative deposition, or sputtering deposition.

Figure 7F:
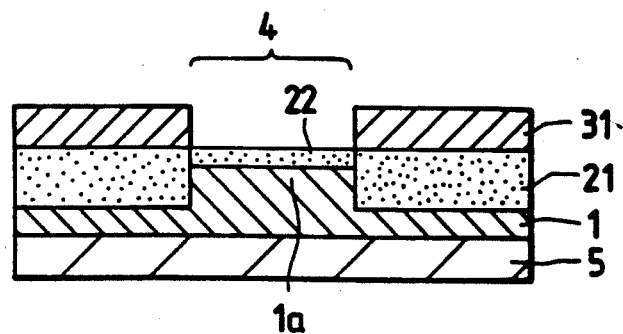

Next, after removing the photoresist layer 7, oxidation of the surface of the upwardly protruding portion 1a is performed, to a thickness of approximately 50 to 200 Å, whereby as shown in FIG. 7F the thin insulating layer (i.e. oxide insulation film) 22 is formed. This is done by a process such as thermal oxidation in an oxygen atmosphere, or anodic oxidation, to form a layer of a material such as $Al_2O_3$, $Ta_2O_5$, etc. When this is completed, an electrically insulating layer has been formed from the insulating layers 21 and 22 which has a flat surface.

Figure 7G:
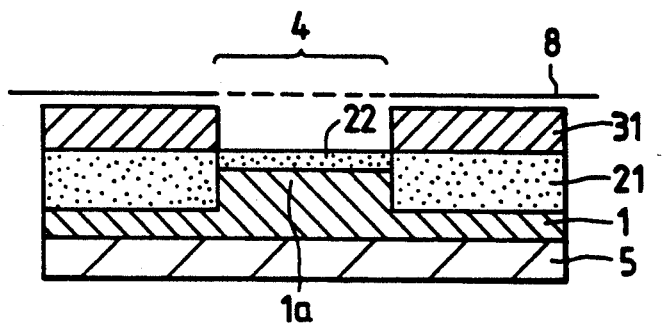

Next, the metal layer of the electron emission region 4 is formed. As shown in FIG. 7G, a mask 8 is positioned with a fixed small amount of separation from the surface of the insulating layer 22, then a metal layer (consisting of a material such as Au, Al, Mo, W, etc) is deposited by evaporative deposition through the mask 8, to a thickness of 100 to 500 Å approximately, by a process such as resistive heating evaporative deposition, electron beam evaporative deposition or sputtering deposition. The mask 8 is provided with open slits at specific positions which correspond to positions where the metal layer is to be formed. These can be for example a parallel array of slits, each having a width of 0.01 to 0.05 mm, a length of 0.5 mm to 1 mm, and a pitch of 0.05 to 0.1 mm.

Figure 7H:
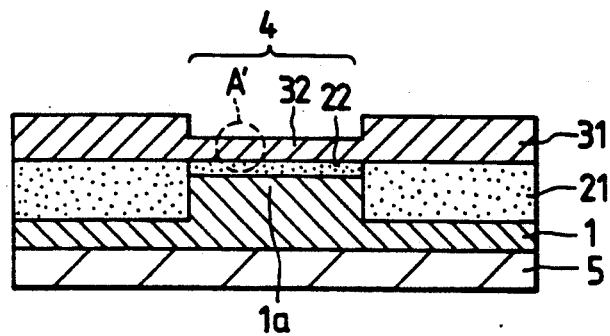
Figure 7I:
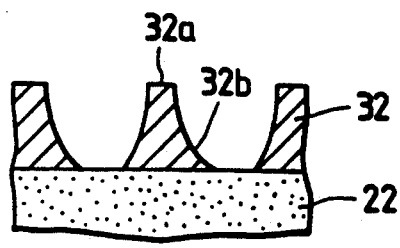

In this way, as a result of deposition of the metal layer as shown in FIG. 7H, a metal layer 32 is formed in the electron emission region 4. FIG. 7I is an expanded view of the portion A' of this metal layer 32. As shown, this consists of flat-topped portions 32a and sloping portions 32b, which result from the mask 8 having been positioned with a slight separation from the surface of the insulating layer 22.

With the electron emission element of FIG. 7H, when compared to the configuration shown in FIG. 6A, the insulating layers 21, 22 correspond to the insulating layer 2, and the metal layers 31, 32 correspond to the metal layer 3. It can thus be understood that both of these electron emission elements are of basically identical configuration.

It should be noted that it would be equally possible to form the metal layer of the electron emission region by first forming a metal layer to the desired thickness for the flat-topped portions over the entire area of the electron emission region, and to then execute selective removal of that layer to a predetermined thickness, at positions such as to ensure that the thick portions and the thin portions (for electron emission) of the metal layer will be uniformly distributed throughout the electron emission region.

In the above embodiments, formation of a single electron emission region is described. However it would be equally possible to produce an array of such electron emission elements, i.e. by forming an array of such electron emission regions.

It should also be noted that the values of thickness for the layers that have been specified for the above embodiments are not intended in a limiting sense.

Figure 8:
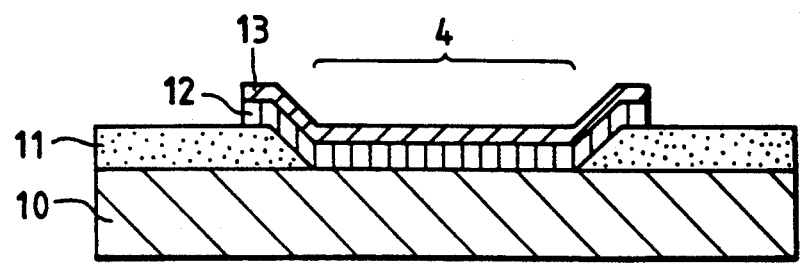
FIG. 8 is a general cross-sectional view of a fourth embodiment of an electron emission element according to the present invention.

FIG. 8 is a general cross-sectional view of a fourth embodiment of an electron emission element according to the present invention. In FIG. 8, numeral 10 denotes a body of electrically conducting material which can be a layer of material formed on a substrate (not shown in the drawing) or can be a substrate which is formed of an electrically conducting material. Numeral 11 denotes an electrically insulating layer, numeral 12 denotes an electrically insulating layer which is formed as a thin crystal film by epitaxial growth with predetermined crystal plane orientation, 13 denotes a metal layer that is formed as a thin film, and 4 denotes an electron emission region of the metal layer 13.

With this electron emission element, the relatively thick insulating layer 11 is formed on the conducting layer 10, in regions other than the electron emission region 4, while the electron emission region 4 contains a very thin (50 to 200 Å) crystal plane-oriented insulating layer 12 and the thin thin metal layer 13 formed on the thin insulating layer 12. If a positive potential of a voltage source is applied to the thin thin metal layer 13 and the negative potential to the conducting layer 10, then a strong electric field will be produced in the thin insulating layer 12, immediately below the electron emission region 4. Electrons are thereby drawn out of the conducting layer 10, and then pass through the thin insulating layer 12 by the tunnelling effect, then pass into the thin thin metal layer 13. Of those electrons which reach the thin thin metal layer 13, the electrons having an amount of energy which is higher than the work function of the metal layer 13 will be emitted from the surface of that layer.

The insulating layer 12 within the electron emission region 4 is a thin film of epitaxially-grown single-crystal insulating material, having the crystal planes thereof appropriately oriented such as to minimize the degree of dispersion of electrons within the thin insulating layer 12 due to interaction with the electrons and atoms of the thin insulating layer 12. For this reason, dispersion and energy loss of tunnelling electrons within the thin insulating layer 12 is substantially reduced by comparison with the prior art, and the number of electrons which reach the thin thin metal layer 13 is correspondingly increased, while in addition the number of electrons reaching the thin thin metal layer 13 which have a sufficiently high energy level to be emitted from the thin thin metal layer 13 is also increased.

Thus, the number of electrons which are emitted from the surface of the thin thin metal layer 13 is substantially increased over the prior art, with a correspondingly high value of electron emission efficiency.

A specific method of manufacture for the electron emission element of FIG. 8 will be described in the following.

Si having a specific resistivity of 0.02 $\Omega$/cm is used as the electrically conducting body 10. The insulating layer 11 consists of a film of $SiO_2$ having a thickness of 1000 Å, formed on a region of the conducting layer 10 outside a region which corresponds to the electron emission region 4. The electron emission region 4 has a diameter of 100 $\mu$m. A film of $Al_2O_3$ is formed by epitaxial growth on the electron emission region 4 as the thin insulating layer 12, using the MBE (molecular beam evaporative deposition) process, with the <111> plane of the crystal structure aligned parallel to the layer surface, and with the film having a thickness of 50 to 200 Å. Next, a layer of Au is formed by evaporative deposition to a thickness of 100 to 200 Å upon the thin insulating layer 12, thereby completing the formation of the electron emission element.

According to measurements made of the electron emission current of an electron emission element manufactured as described above, an emission current of 0.1 mA is obtained under DC operation, while a emission current of 10 mA is obtained under pulse operation. The electron emission ratio $a_m$ (i.e. the ratio of the electron current which is emitted from the metal layer surface to the current which is supplied from the power source) is approximately 0.09.

Figure 9:
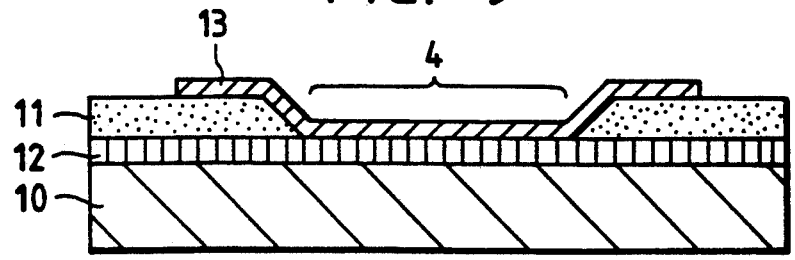
FIG. 9 is a general cross-sectional view of a fifth embodiment of an electron emission element according to the present invention.

A fifth embodiment of the present invention, will be described in the following, referring to FIG. 9. In FIG. 9, numeral 10 denotes an electrically conducting body, 11 denotes an electrically insulating layer, numeral 12 denotes an electrically insulating layer formed of a thin film of epitaxially grown crystal, with the crystal planes oriented in predetermined directions, 13 denotes a metal layer, 4 denotes an electron emission region.

The configuration of this embodiment is as follows. The insulating layer 12 is first formed on the electrically conducting body 10, then the insulating layer 11 is formed over regions other than the electron emission region 4. Next, the thin metal layer 13 is formed on the electron emission region 4.

Due to the fact that the insulating layer below the electron emission region 4 is a thin film of epitaxially-grown crystal, with the crystal planes oriented to minimize energy loss of electrons which pass through that layer due to the tunnelling effect, as for the preceding embodiment, electrons which pass through the insulating layer 12 experience a low degree of dispersion and hence the electron emission efficiency is high.

The method of manufacture for this embodiment of an electron emission element is substantially identical to that of the embodiment of FIG. 8 described above, except for a change in the sequence in which the insulating layers 12 and 11 are formed. It has been found that the characteristics of this embodiment are also substantially the same as those of the embodiment of FIG. 8.

Figure 10A:
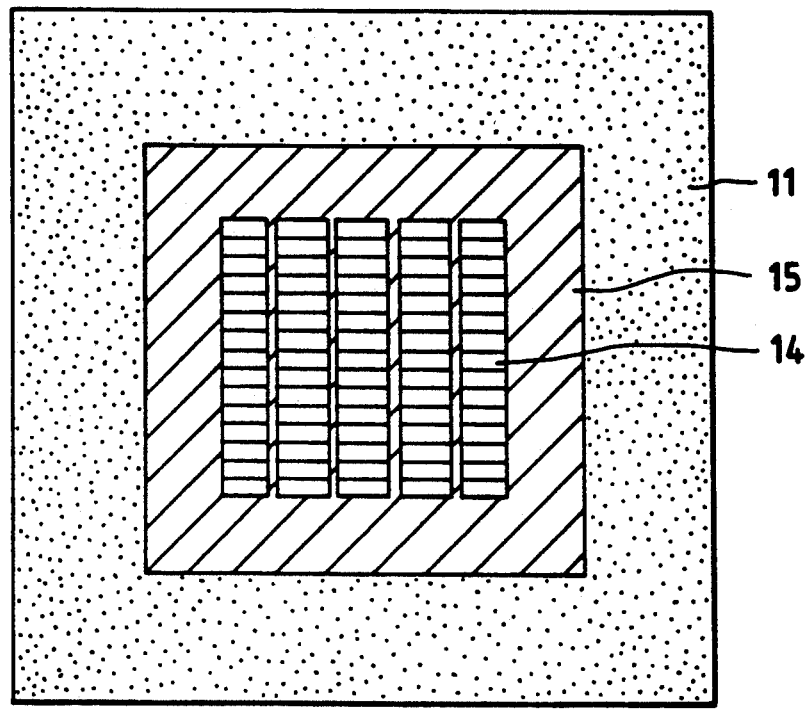
FIG. 10A is a plan view of a sixth embodiment of an electron emission element according to the present invention.
Figure 10B:
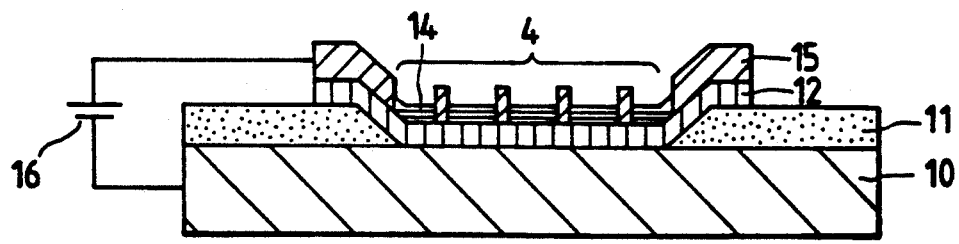
FIG. 10B is a corresponding cross-sectional view.

FIGS. 10A and 10B show a sixth embodiment of an electron emission element according to the present invention, in which numeral 10 denotes an electrically conducting body which can consist of a layer of electrically conducting material formed on a substrate or can be an electrically conducting substrate, numeral 11 denotes an electrically insulating layer, numeral 12 denotes an electrically insulating layer formed of a thin film of epitaxially grown crystal, with the crystal planes oriented in predetermined directions, 14 denotes a first metal layer, 15 denotes a second metal layer, and 16 denotes a power source.

With this electron emission as shown in FIG. 10B, a relatively thick insulating layer 11 is formed on regions of the conducting layer 10 other than an electron emission region 4, while the crystal plane-oriented insulating layer 12, which is very thin (50 to 200 Å) covers the electron emission region 4. The first and second metal layers 14 and 15 are formed on this insulating layer 12. The first metal layer 14 is formed as an extremely thin film, while the second metal layer 15 is substantially thicker than the metal layer 14, and has a grid shape. All of the portions of the second metal layer 15 are mutually electrically connected. The first and second metal layers 14 and 15 are mutually electrically connected.

With such an electron emission element, a voltage from the power source 16 is applied between the electrically conducting body 10 and the metal layers 14, 15. The voltage of the power source is transferred through the thick metal layer 15 (which is made sufficiently thick to ensure that almost no vd occurs therein) to be applied to the first metal layer 14. Thus, since a sufficiently high voltage can be applied to the metal layer 14 (i.e. substantially 100% of the power source voltage), a strong electric field can be produced in the electron emission region 4, so that a large number of electrons are emitted from the surface of the metal layer 14. This is achieved without the need for increasing the voltage of the power source 16, so that there is no danger of damage occurring to the thin first metal layer 14 because of Joule heat being generated by power dissipation therein.

A specific example of a method of manufacture for this embodiment will be described in the following. First, the electrically conducting body 10 is formed as a film of Al, as a single-crystal layer with crystal axes oriented in predetermined directions, upon an electrically insulating substrate (not shown in the drawings, consisting of a material such as Pyrex glass), by MBE deposition. Next, a layer of amorphous $Al_2O_3$ is formed to a thickness of 1,000 Å upon regions of the electrically conducting body 10 other than a region corresponding to the electron emission region 4, as the insulating layer 11. A film of $Al_2O_3$ having a thickness of 50 to 200 Å is then formed overall, including the region corresponding to the electron emission region 4, as a single-crystal layer with crystal axes oriented in predetermined directions to thereby form the the insulating layer 12, also by an MBE epitaxial growth process. Next, a film of Au is formed to a thickness of 1,000 Å with a grid-shaped configuration, for example as shown in FIG. 10A, by using a photolithographic process, to thereby form the second metal layer 15. The first metal layer 14 is then formed as a thin film of Au having a thickness of 100 to 200 Å, by MBE deposition. It has been found by measurement that the electron emission ratio $\alpha_n$ for an MIM electron emission element manufactured by the above method is equal to 0.07 approximately.

Figure 11:
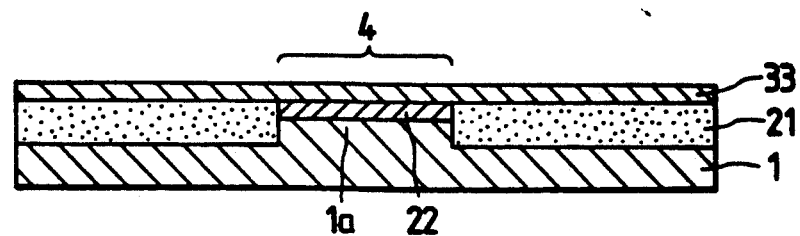
FIG. 11 is a general cross-sectional view of a seventh embodiment of an electron emission element according to the present invention.

FIG. 11 is a general cross-sectional view of a seventh embodiment of an electron emission element according to the present invention, in which numeral 1 denotes an electrically conducting layer, 22 denotes an electrically insulating layer which is formed as a thin film, 21 denotes an electrically insulating layer, 33 denotes a metal layer which is formed as a thin film, and 4 denotes an electron emission region of the metal layer 33 With this embodiment of an electron emission element, the conducting layer 1 is formed with an upwardly protruding portion 1a, over which is formed the thin insulating layer 22. In addition, the insulating layer 21 is formed on regions of the conducting layer 1 outside of the aforementioned upwardly protruding portion 1a of the conducting layer 1, with the upper surface of the insulating layer 21 being coplanar with the upper surface of the insulating layer 22. The metal layer 33 is formed as a continuous layer over the insulating layer 22 and insulating layer 21. When a voltage is applied by connecting the metal layer 33 to a positive potential and the conducting layer 1 to a negative potential, a strong electric field is formed in the insulating layer 22, immediately below the electron emission region 4. Electrons are thereby drawn out of the conducting layer 1, and as a result of the tunnelling phenomenon within the insulating layer 22, the electrons pass into the metal layer 33. Those electrons which have an energy that is greater than the work function of the metal layer 33 are emitted from the electron emission region 4.

With this embodiment, due to the fact that the interface between the insulating layer 22 and the metal layer 33 is a single plane, without any step changes in height or thickness of these layers, the insulating layer 22 and metal layer 33 can easily be formed as a respective uniform thin films, so that stable electron emission characteristics can be obtained. In addition, if an array consisting of a plurality of such electron emission elements is formed, then uniformity of electrical characteristics for the respective electron emission elements of the array can be ensured.

Figure 12A:
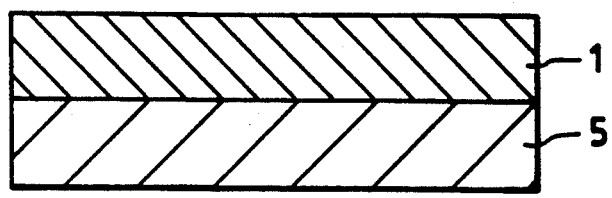
FIGS. 12A to 12G are cross-sectional views illustrating steps of a method of manufacture for the electron emission element of FIG. 11.
Figure 12B:
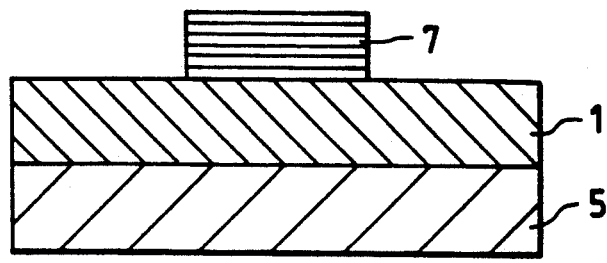
Figure 12C:
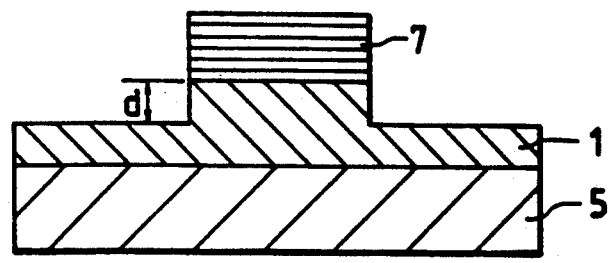
Figure 12D:
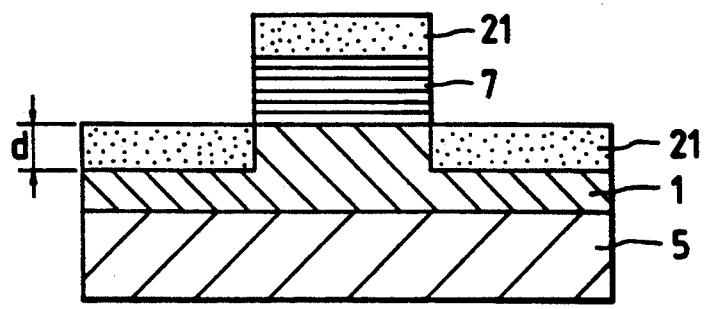
Figure 12E:
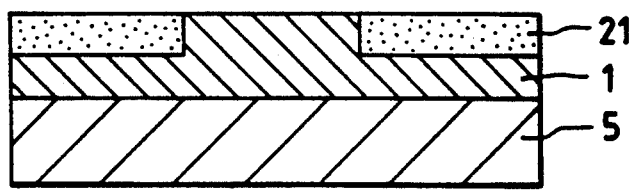
Figure 12F:
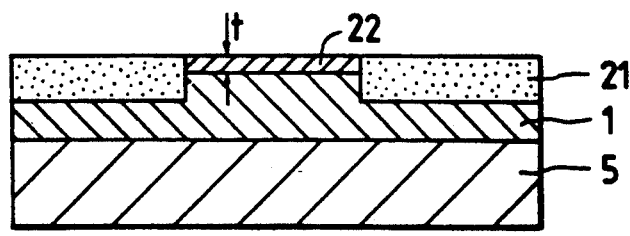
Figure 12G:
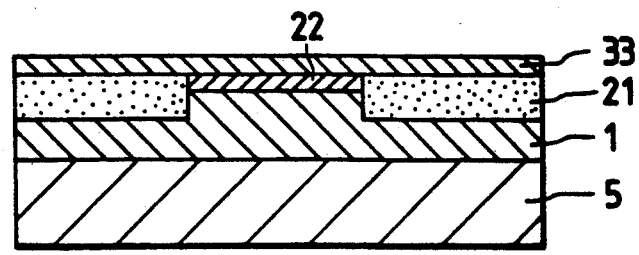

A method of manufacture for such an electron emission element will be described referring to FIGS. 12A to 12G. Firstly, a layer of a metal such as Al or Ta is formed by a process such as resistive heating evaporative deposition, electron beam evaporative deposition, or sputtering deposition, to a thickness of 0.1 to 1 $\mu$m approximately, upon a surface of a glass substrate 5, to thereby form an electrically conducting layer 1 (FIG. 12A). Next, a layer of photoresist 7 is formed by the usual photolithographic process on the insulating layer 1 (FIG. 12B). Etching of the conducting layer 1 is then executed to a depth d, where d is for example 0.05 to 0.5 $\mu$m approximately. This etching is performed by a process such as ion milling or wet etching. (Step 12C). A layer of an electrically insulating material such as $SiO_2$, $Al_2O_3$, or $Ta_2O_5$ is then formed overall, to a thickness which is equal to the depth d. This layer is formed by a process such as electron beam evaporative deposition or sputtering deposition (FIG. 12D). The photoresist layer 7 is then removed (FIG. 12E). Next, thermal oxidation in an oxygen atmosphere, or anodic oxidation is executed to form a film of a material such as $Al_2O_3$ or $Ta_2O_5$ as the thin insulating layer 22. This film is formed to a thickness t, where t is for example 50 to 200 Å approximately (FIG. 12F). The metal layer 33 is then formed on the surfaces of the insulating layers 5 and 22, as a layer of a material such as Au, Al, Mo or W, by a process such as resistive heating evaporative deposition, electron beam evaporative deposition or sputtering deposition. This layer is formed to a thickness of 50 to 200 Å approximately. This completes the formation of the electron emission element of the above embodiment (FIG. 12G). Uniform electron emission characteristics and stable operation are obtained with such an electron emission element.

The above description has been given for the case in which a substrate is provided below the conducting material. However identical results can be obtained with the invention without utilizing a substrate.

Figure 13:
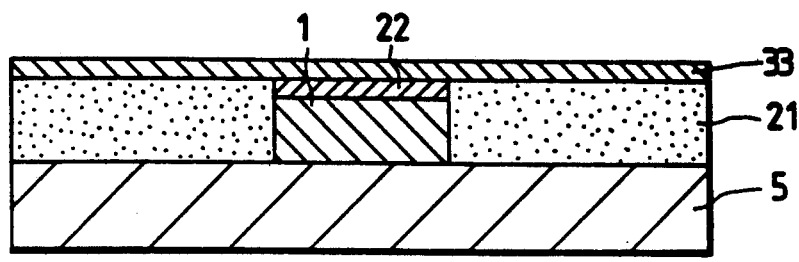
FIG. 13 is a general cross-sectional view of an eighth embodiment of an electron emission element according to the present invention.

An eighth embodiment of an electron emission element according to the present invention will be described, referring to the general cross-sectional view of FIG. 13, in which numeral 5 denotes a substrate, 1 denotes an electrically conducting layer, 21 denotes an electrically insulating layer, 22 denotes a thin-film electrically insulating layer, 33 denotes a thin-film metal layer. The method of manufacture of such an electron emission element is as follows. The conducting layer 1 is formed on a predetermined region of the substrate 5, the thin insulating layer 22 is then formed on the conducting layer 1, and the insulating layer 21 is formed on a specific region of the substrate 5 other than the region in which the conducting layer 1 is formed. The insulating layer 21 is formed such that the upper surface thereof is co-planar with the upper surface of the thin insulating layer 22. A thin metal layer 33 is then formed over both the insulating layers 21 and 22.

It should be noted that it would be equally possible to make the value of the thickness d (in the manufacturing steps of FIGS. 12C and 12D above) identical to the original thickness of the conducting layer 1. If this is done, and the identical steps of FIGS. 12A to 12G are utilized, then an electron emission element having uniform electron emission distribution over the electron emission region and stability of operation can be produced.

Furthermore although the above process has been described for the case of a single electron emission element being manufactured, it would be equally possible to similarly manufacture an array of a plurality of electron emission elements in this way, with similar results being obtained.

With the seventh and eighth embodiments described above, the respective upper surfaces of the thin first insulating layer 22 and the second insulating layer 21 are co-planar, with no step changes in height. Thus, the thin metal layer 33 that is formed thereon is completely flat and of uniform thickness. As a result, the formation of internal defects in the metal layer 33 can be prevented, so that high reliability and stability of operation is obtained. If an array of such electron emission elements is manufactured by the above process, a high degree of uniformity of characteristics of the respective elements of the array can be obtained, together with a high degree of electron emission efficiency.

Figure 14:
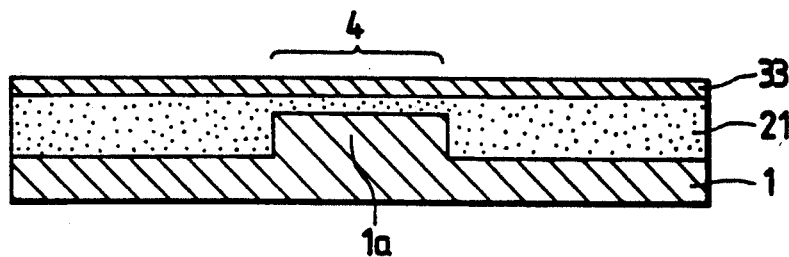
FIG. 14 is a general cross-sectional view of a ninth embodiment of an electron emission element according to the present invention.

FIG. 14 shows a general cross-sectional view of a ninth embodiment of an electron emission element according to the present invention. The configuration of this electron emission element is: conducting layer (conducting material) 1 - insulating layer 21 - metal layer 33. The conducting layer 1 has an upwardly protruding portion 1a. The insulating layer 21, which is sandwiched between the conducting layer 1 and the metal layer 33, is formed such that an upper surface thereof extends over both the upwardly protruding portion 1a of the conducting layer 1 and the remaining region of the conducting layer 1. The upwardly protruding portion 1a corresponds in position to an electron emission region 4.

When a voltage is applied such that the conducting layer 1 is connected to a negative potential and the metal layer 33 to a positive potential, a strong electric field is produced in the thin insulating layer 21, below the electron emission region 4. As a result, electrons are drawn out of the conducting layer 1 and pass through the insulating layer 21 by the tunnelling phenomenon. Those electrons which have an energy that is greater than the work function of the metal layer 33 are emitted from the metal layer 33, in the electron emission region 4.

Figure 15:
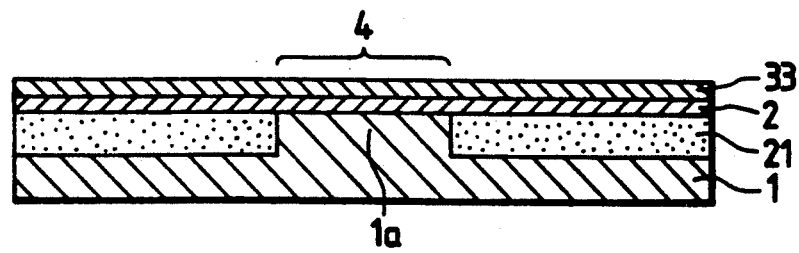
FIG. 15 is a general cross-sectional view of a tenth embodiment of an electron emission element according to the present invention.

FIG. 15 shows a general cross-sectional view of a tenth embodiment of an electron emission element according to the present invention, whose configuration is: conducting layer (conducting material) conducting layer 1 - insulating layers 21, 22 - metal layer 33. Specifically, the insulating layer that is sandwiched between the conducting layer 1 and the metal layer 33 has an upper surface that covers all of the conducting layer 1 other than the upwardly protruding portion 1a. The first insulating layer insulating layer 21 has an upper surface that is co-planar with the upper surface of the upwardly protruding portion 1a. The second insulating layer 22, which is formed such as to extend over both the upwardly protruding portion 1a and the insulating layer 21, has a flat upper surface. The electron emission region 4 is defined by the upwardly protruding portion 1a. The remaining features of this embodiment are identical to those of the ninth embodiment described above, so that further description will be omitted.

When a voltage is applied such that the conducting layer 1 is connected to a negative potential and the metal layer 33 to a positive potential, a strong electric field is produced in the thin second insulating layer 22, below the electron emission region 4. As a result, electrons are drawn out of the conducting layer 1 and pass through the second insulating layer 22 by the tunnelling phenomenon. Those electrons which have an energy that is greater than the work function of the metal layer 33 are emitted from the metal layer 33, in the electron emission region 4.

With the electron emission element embodiments of FIGS. 14 and 15, the metal layer 33 is formed over an electrically insulating layer (21 or 22) having a flat surface. The metal layer 33 is thereby formed with a flat surface, and of uniform thickness. As a result, the formation of internal defects in the metal layer 33 can be prevented, so that high reliability of electrical conduction within that layer and stability of electron emission are obtained.

Figure 16A:
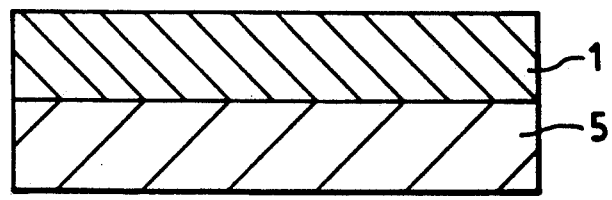
FIGS. 16A to 16G are cross-sectional views illustrating steps of a method of manufacture for the electron emission element of FIG. 15.

A method of manufacture for the embodiment of an electron emission element of FIG. 15 will be described, referring to FIGS. 16A to 16G. Firstly, an electrically conducting layer 1 is formed as shown in FIG. 16A, by evaporative deposition of a metal upon a surface of an electrically insulating substrate 5 (consisting of a material such as glass). The evaporative deposition can be performed by a process such as resistive heating evaporative deposition, electron beam evaporative deposition, sputtering deposition, CVD, MBE or ion beam deposition. The conducting layer 1 can be formed of a metal such as Au, Al, Pt, Mo, Ta, Ag, W, Cr, etc, to a thickness of 0.1 to 1 µm approximately.

Figure 16B:
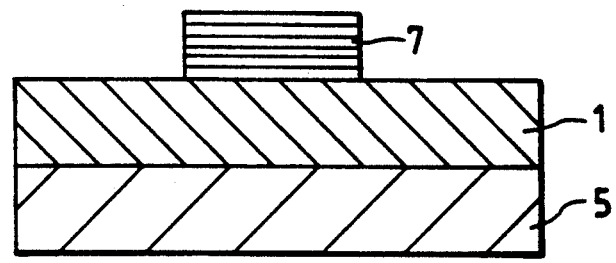

Next, as shown in FIG. 16B, a layer of photoresist 7 is formed selectively on a portion of the conducting layer 1 that corresponds to the electron emission region. The photoresist 7 is formed by the usual photo-lithography method.

Figure 16C:
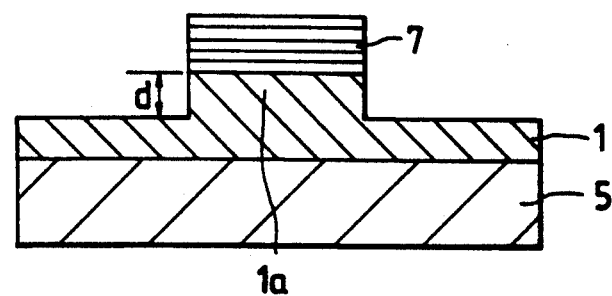

After forming the photoresist layer 7, etching of the conducting layer 1 to a depth d of, for example, 0.05 to 0.5 µm is executed, in a region of the conducting layer 1 surface which is not covered by the photoresist. The etching can be performed by a process such as ion milling or wet etching. As a result, as shown in FIG. 16C, the upwardly protruding portion 1a of the conducting layer 1 is formed.

Figure 16D:
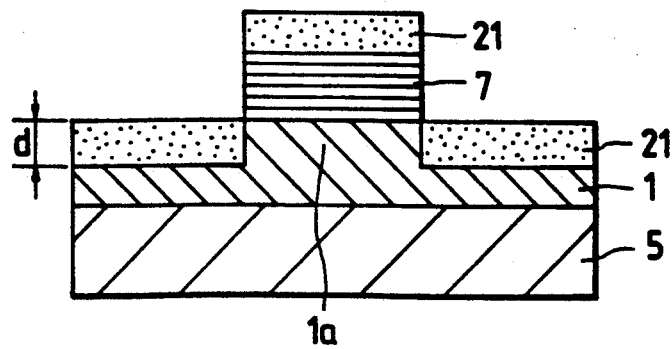

Next, as shown in FIG. 16D the first insulating layer is formed overall, with a thickness which is equal to the aforementioned depth d, so that an upper surface of this first insulating layer 21 is co-planar with the upper surface of the upwardly protruding portion 1a. The first insulating layer 21 is formed by a process such as electron beam evaporative deposition, sputtering deposition, CVD, MBE or ion beam deposition, and consisting of a material such as $SiO_2$, $Al_2O_3$, $Ta_2O_5$, $SiN_x$, BN, AlN, C, etc.

Figure 16E:
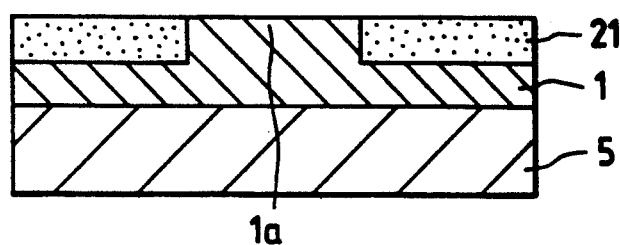
Figure 16F:
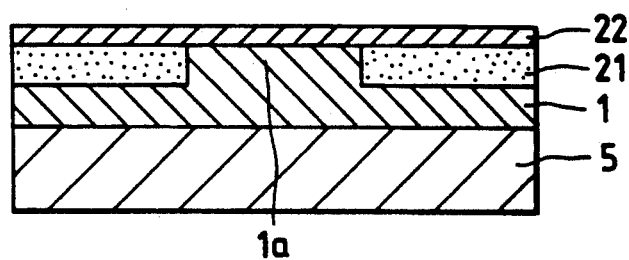

After forming the first insulating layer 21, as shown in FIG. 16E, the photoresist layer 7 is removed. Next, (as shown in FIG. 16F) the upper surface of the first insulating layer 21 and the upwardly protruding portion 1a have the second insulating layer 22 formed thereon, to a thickness of 50 to 200 Å approximately. The second insulating layer 22 can be formed by a method such as electron beam evaporative deposition, sputtering deposition, CVD, MBE, or ion beam deposition, and consisting of a material such as $SiO_2$, $Al_2O_3$, $Ta_2O_5$, $SiN_x$, BN, AlN, C, etc.

Figure 16G:
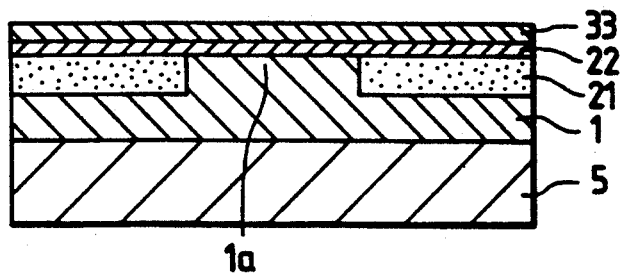

Finally, as shown in FIG. 16G, the metal layer 33 is formed as a layer of Au, Al, Mo, W, etc, over the flat surface of the second insulating layer 22, to thereby complete the formation of the electron emission element. The metal layer 33 is formed by a process such as resistive heating evaporative deposition, vacuum evaporative deposition, CVD, MBE, ion beam deposition, etc, and is preferably formed to a thickness of 50 to 200 Å.

As can be understood from the above description, the upwardly protruding portion 1a of the insulating layer 1 defines the electron emission region 4. The upwardly protruding portion 1a can be formed to any desired shape, by a process such as etching, and hence the shape of an electron beam that is formed of the electrons produced from the electron emission region can be made of any arbitrary form.

Figure 17:
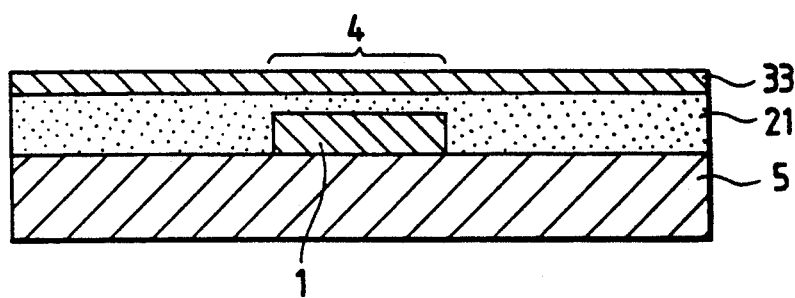
FIGS. 17 and 18 are general cross-sectional views showing an eleventh and a twelfth embodiment of an electron emission element according to the present invention, respectively.

FIG. 17 shows a general cross-sectional view of an eleventh embodiment of an electron emission element according to the present invention. The configuration of this electron emission is basically: electrically insulating substrate 5 - electrically conducting layer (or conducting body) 1 - electrically insulating layer 21 - metal layer 33. The conducting layer 1 is formed on a region of the insulating substrate 5, of specific shape and position. The insulating layer 21 that is sandwiched between the conducting layer 1 and the metal layer 33 is configured such as to cover both a region of the surface of the insulating substrate 5 that is not covered by the conducting layer 1 and also the surface of the conducting layer 1, and is formed with a flat upper surface. The upper surface of the conducting layer 1 defines the shape and position of the electron emission region 4.

When a voltage is applied such that the conducting layer 1 is connected to a negative potential and the metal layer 33 to a positive potential, a strong electric field is produced in a thin film portion of the insulating layer 21 which is immediately below the electron emission region 4 of the metal layer 33. As a result, electrons are drawn out of the conducting layer 1 and pass through the insulating layer 21 by the tunnelling phenomenon. Those electrons which have an energy that is greater than the work function of the metal layer 33 are emitted from electron emission region 4 of the metal layer 33.

Figure 18:
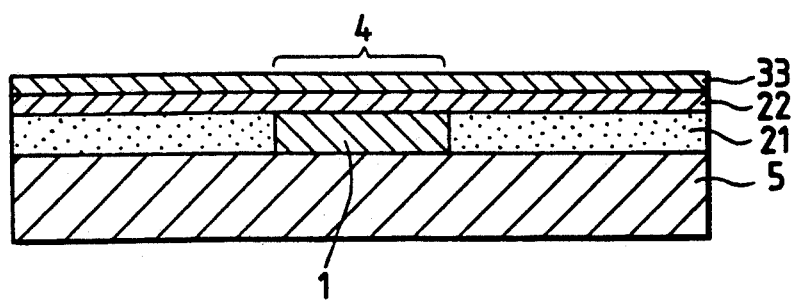

FIG. 18 shows a general cross-sectional view of a twelfth embodiment of an electron emission element according to the present invention. With this electron emission element embodiment, the configuration is basically: insulating substrate 31 - electrically conducting layer 1 - electrically insulating layers 21, 22 - metal layer 33. The insulating layers that are sandwiched between the conducting layer 1 and the metal layer 33 consist of a first insulating layer 21 which covers a region of the substrate 31 that is not covered by the conducting layer 1 and which has an upper surface that is co-planar with the upper surface of the conducting layer 1, and a second insulating layer 22 which covers the upper surfaces of both the first insulating layer 21 and the conducting layer 1. The electron emission region 4 is defined by the area of intersection between the conducting layer 1 and the metal layer 33. The remaining features of this embodiment are identical to those of the embodiment of FIG. 17 above, and further description will be omitted.

When a voltage is applied such that the conducting layer 1 is connected to a negative potential and the metal layer 33 to a positive potential, a strong electric field is produced in the portion of the thin second insulating layer 22, below the electron emission region 4. As a result, electrons are drawn out of the conducting layer 1 and pass through the second insulating layer 22 by the tunnelling phenomenon. Those electrons which have an energy that is greater than the work function of the metal layer 33 are emitted from the electron emission region 4 of the metal layer 33.

With the electron emission element embodiments of FIGS. 17 and 18, as for the embodiments of FIGS. 14 and 15, the metal layer 33 is formed over a flat upper surface of the insulating layers 21, 22, thereby ensuring that the metal layer 33 can be made of precisely uniform thickness, with no variations in height, so that a high degree of reliability of electrical conduction within that metal layer is obtained.

Furthermore, with the embodiments of FIGS. 17 and 18, the conducting layer 1 that is formed on a region of a surface of the substrate 5 defines the shape and position of the electron emission region 4. Since the shape (i.e. as seen in plan) of the conducting layer 1 can be freely selected, any arbitrary shape can be selected for an electron beam that is formed from the electrons that are emitted from the electron emission region.

It has been found from measurements made on each of the embodiments of FIGS. 14 through 17 that, in each case, the shape of a beam spot of an electron beam obtained from the electron emission element corresponds to the shape of the electron emission region of that electron emission element.

Furthermore with each of the embodiments of FIGS. 14 through 17, it would be possible to form an electron emission element with a plurality of electron emission regions, arrayed in a predetermined array configuration. It has been found that if such an array configuration is utilized, the various advantages described hereinabove are still obtained.

Moreover for each of the embodiments of FIGS. 15 and 18, instead of forming the second insulating layer 22 by deposition of a layer of electrically insulating material after forming the first insulating layer 21, it would be equally possible to form an electrically insulating oxide film by oxidation of a surface portion of the conducting layer 1, and to form the metal layer 33 over this insulating oxide film and the first insulating layer 21.

It should also be noted that it is not essential that the metal layer 33 be formed above the entire upper surface of the upwardly protruding portion 1a of the conducting layer 1, and that it would be equally possible to arrange that the metal layer 33 is formed over only a portion of the upwardly protruding portion 1a. In that case, the electron emission region would be defined by the region of intersection of the upwardly protruding portion 1a and the metal layer 33, as viewed in plan.

With each of the embodiments of FIGS. 11 through 18 described above, a metal layer 33 is formed over a completely flat surface of an electrically insulating layer (21 or 22). As a result, the metal layer 33 can be made completely flat and of uniform thickness, ensuring that a high degree of reliability of electrical conduction within that metal layer is achieved, together with stable and uniform electron emission throughout the electron emission region. Furthermore since any arbitrary shape of the electron emission region can be easily selected, the shape of the beam spot of an electron beam produced by utilizing such an electron emission element can be easily determined in accordance with a specific application. Thus these embodiments are highly practical.

What is claimed is:

1. An electron emission element comprising an electrically conducting layer which includes an upwardly protruding portion, a first electrically insulating layer formed on said upwardly protruding portion, a second electrically insulating layer formed on a surface region of said conducting layer excluding said upwardly protruding portion, with an upper surface of said second insulating layer being co-planar with an upper surface of said first insulating layer, and a metal layer formed upon said first and second insulating layers.

2. An electron emission element according to claim 1, in which the thickness of said first insulating layer is selected such as to permit an electron tunnelling effect to occur in said insulating layer.

3. An electron emission element according to claim 1, in which said first insulating layer is formed as an oxide of said conducting layer.

4. An electron emission element comprising a substrate, an electrically conducting layer formed on a predetermined region of a surface of said substrate, a first electrically insulating layer formed on said conducting layer, a second insulating layer formed on a region of said substrate outside said first insulating layer, with an upper surface of said second insulating layer being co-planar with an upper surface of said first insulating layer, and a metal layer formed on said first and second insulating layers.

5. An electron emission element according to claim 4, in which the thickness of said first insulating layer is selected such as to permit an electron tunnelling effect to occur in said first insulating layer.

6. An electron emission element according to claim 4, in which said first insulating layer is formed as an oxide of said conducting layer.

* * * * *